2,793,231

PREPARATION OF MALEURIC ACID

Thomas H. Newby, Middlebury, Conn., Robert H. Snyder, North Caldwell, N. J., and Howard A. Hageman, Southbury, Conn., assignors to United States Rubber Company, New York, N. Y., a corporation of New Jersey No Drawing. Application December 15, 1954, Serial No. 475,564

5 Claims. (Cl. 260—534)

This invention relates to an improved method of making maleuric acid from urea and maleic anhydride according to the equation

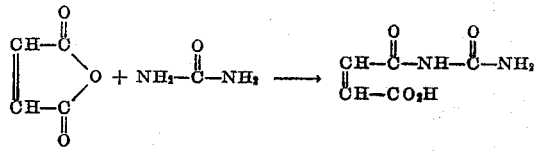

An object of the invention is to provide a method whereby the maleuric acid can be made in better yield and purity than has heretofore been possible. A further object is to obviate the disadvantages residing in the heretofore method of fusion (without solvent) of urea and maleic anhydride, as well as those residing in a method of reacting in the presence of a mutual solvent such as acetic acid, which prior methods accumulate too many impurities and require too long a time.

It has now been discovered that maleuric acid can be prepared in high purity and in substantially quantitative yield by triturating the maleic anhydride and the urea in the presence of an inert saturated liquid hydrocarbon constituting from about 20 to 50% of the weight of the entire mix and which normally, i. e., under atmospheric pressure, boils at a temperature in the range of about 85° C. to about 120° C. Blends of such hydrocarbons which boil within said range may also be used, especially such hydrocarbons as they are available commercially in the form of mixes that boil within the specified range.

The usable liquid saturated hydrocarbons embrace preferably the aliphatic hydrocarbons such as n-heptane, 3-methyl hexane, 3-ethyl pentane, 3-methyl heptane, 4-methyl heptane, 3-ethyl hexane, etc.

The following example illustrates the invention.

Example

Maleic anhydride (17.25 lbs.) and a saturated aliphatic hydrocarbon mixture (ligroin) (10 lbs.) boiling range: 90° C.–120° C., were charged to a 5 gallon Werner and Pfleiderer mixer equipped with a reflux condenser and vacuum distillation set-up. The mixture was heated to 60° C.–70° C. to melt the maleic anhydride. Urea (11 lbs.) was then added and the mixture heated slowly to 95° C. with mixing, in the Werner and Pfleiderer mixer, which causes trituration of the reactants. In this temperature range an exothermic reaction started and it was necessary to run cooling water through the jacket to maintain the temperature at 95° C.–100° C. After the initial exotherm the temperature of the batch was maintained at 95° C.–103° C. for two hours by the use of free steam. The refluxing hydrocarbon aided in controlling the temperature.

At the end of two hours the hydrocarbon components were removed from the mixer by applying 5″ of vacuum to the system. The hydrocarbon was caught in a receiver and recovered for reuse.

The dry powder left behind in the reactor weighed 30 pounds and contained 4% volatile material. It melted with decomposition at 142° C.

Washing of the maleuric acid with acetone resulted in an 87% overall yield of product melting at 155° C.–156° C. Washing with water resulted in an 85% overall yield of material melting at 161° C.–162° C.

The usable liquid saturated hydrocarbons embrace preferably the aliphatic hydrocarbons such as the heptanes and octanes.

Having thus described our invention, what we claim and desire to protect by Letters Patent is:

1. A method of preparing maleuric acid which comprises triturating maleic anhydride with urea in the presence of an inert saturated aliphatic hydrocarbon which normally boils at a temperature in the range of about 85° C. to about 120° C. and heating under reflux the mix sufficiently high to cause boiling of the hydrocarbon.

2. A method of preparing maleuric acid which comprises triturating maleic anhydride with urea in the presence of an inert saturated aliphatic hydrocarbon material which normally boils at a temperature in the range of about 90° C. to 120° C. and heating under reflux the mix sufficiently high to cause boiling of the hydrocarbon components, afterwards removing the hydrocarbon components and recovering the maleuric acid.

3. A method of preparing maleuric acid which comprises heating under reflux, while triturating and reacting a melt of maleic anhydride with solid urea, in the presence of an inert saturated aliphatic hydrocarbon which boils at a temperature in the range of about 90° C. to about 120° C., the heating temperature being sufficiently high to cause boiling of the hydrocarbon.

4. A method of preparing maleuric acid which comprises heating under reflux, while triturating and reacting a melt of maleic anhydride with solid urea, in the presence of an inert saturated aliphatic hydrocarbon which boils at a temperature in the range of about 90° C. to about 120° C., the heating being under refluxing conditions and at a temperature sufficiently high to cause boiling of the hydrocarbon, the amount of the inert hydrocarbon being from about 25 to about 50% by weight of the weight of the entire mixture which is heated under reflux.

5. A method of preparing maleuric acid which comprises heating under reflux, while triturating and reacting a melt of maleic anhydride with solid urea, in the presence of an inert saturated aliphatic hydrocarbon which boils at a temperature in the range of about 90° C. to about 120° C., the heating temperature being sufficiently high to cause boiling of the hydrocarbon, afterwards removing the inert hydrocarbon component of the mixture and recovering maleuric acid.

References Cited in the file of this patent

UNITED STATES PATENTS 2,717,908   Snyder _____ Sept. 13, 1955

OTHER REFERENCES

Dunlap et al.: Am. Chem. J., vol. 19, pp. 492–6 (1897).